April 26, 1960       I. F. KENNEDY       2,934,055
AUTOMATIC STARTING DEVICE
Filed July 5, 1957
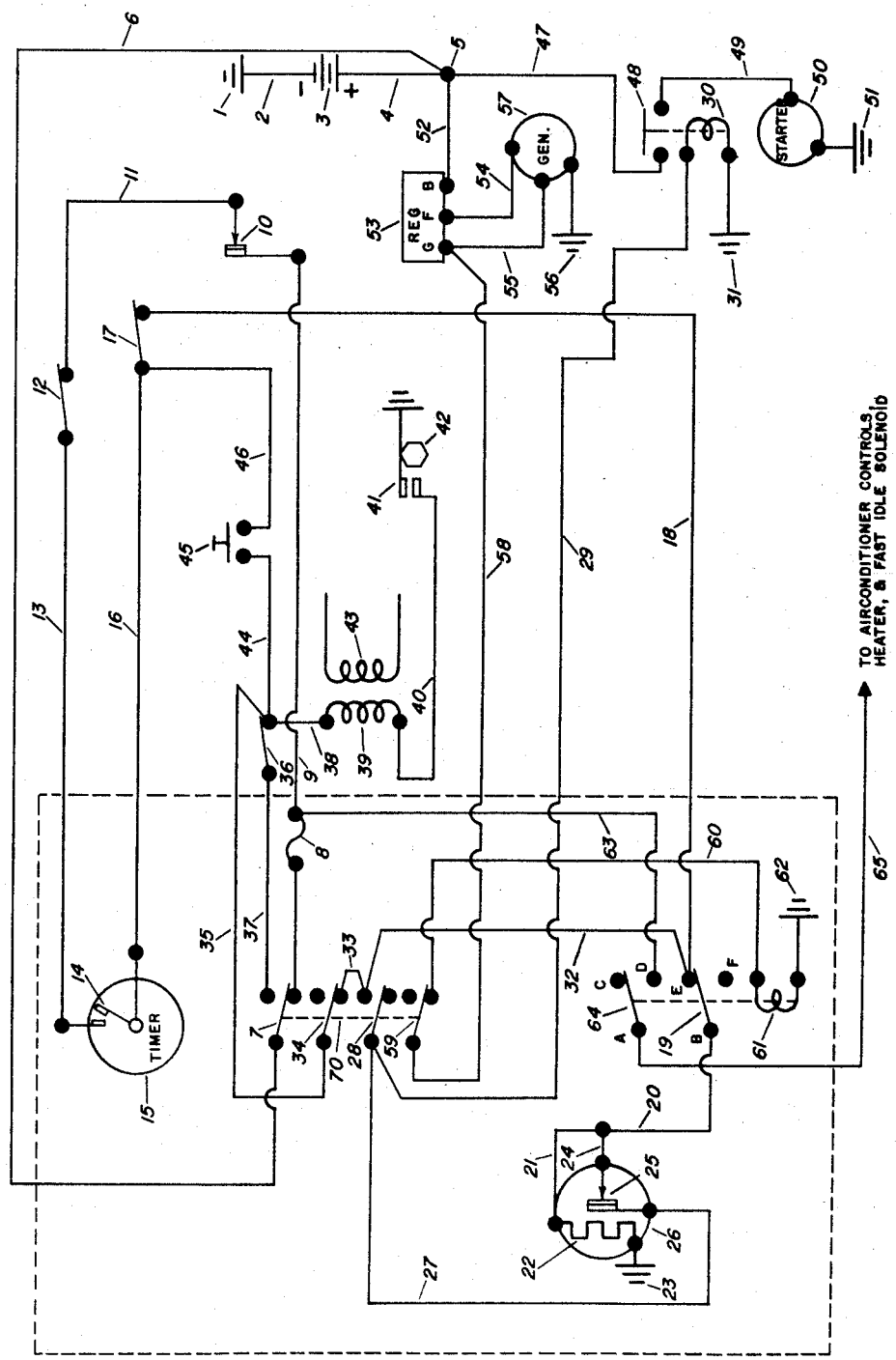
INVENTOR
Ivan F. Kennedy United States Patent Office 2,934,055
Patented Apr. 26, 1960

2,934,055
AUTOMATIC STARTING DEVICE

Isaac Frock Kennedy, Carrollton, Tex.

Application July 5, 1957, Serial No. 670,098

1 Claim. (Cl. 123—179)

Description.—An automatic starting device for automobiles and other internal combustion engines.

This invention relates to improvements in a device for automatically starting automobiles and other internal combustion engines and refers particularly to a device for automatically energizing the starting motor and ignition circuit; maintaining the starting motor and ignition circuit potentially energized for a predetermined period of time or until engine is started, at which time operation of the generator will automatically de-energize the starting motor, leaving ignition energized and energizing the heater and/or air conditioner controls, whichever is selected, by energizing a double pole double throw relay; and automatically stopping the operation of the automobile or internal combustion engine if engine temperature becomes excessive.

It is desirable in warm climates to cool the interior of the automobile or vehicle before occupancy. It is also desirable in cold climates to heat the interior of automobile or vehicle before occupancy.

If the operator of automobile or vehicle knows when he will occupy the automobile or vehicle, he may set the automatic timer and master switch of the automatic starting device at a predetermined time and permit the engine to operate to either cool or heat the interior of the automobile or vehicle.

My invention contemplates as an important feature thereof, a device to automatically set into operation the engine of the automobile or vehicle at a predetermined time and automatically energizing the fast idle solenoid, heater and/or air conditioner when generator begins to operate. If the generator fails to operate, the air conditioner controls or heater controls will not be energized thereby preventing battery from becoming exhausted from excessive current drain.

If the engine should become defective and not start, a provision is made to de-energize the starter motor circuit at the end of a predetermined time to prevent exhausting the battery.

Another important feature of my invention is means contemplated to keep throttle open enough to allow engine to idle fast enough to operate generator and air conditioning equipment.

Other advantages of my invention will be apparent from the accompanying drawing and the following detailed description.

Referring in detail to the drawing or electrical schematic, 3 indicates a source of electric current or storage battery of automobile or vehicle. One side of battery 3 is connected to ground 1 by means of conductor 2. A conductor 4 connects the battery 3 to terminal 5. Conductor 6 connects terminal 5 to switch contact 7 of manually operated four pole double throw master switch 70. With switch 70 in position as shown, current will flow across contact 7 through fuse 8. Two conductors are connected to fuse 8. Conductors 63 connects fuse 8 with terminal D of relay 61. At this time relay 61 is not energized so current cannot flow through contact 64 of relay 61. Back to fuse 8 we find conductor 9 connects fuse 8 to engine overheat switch 10. (This is a water temperature switch set at approximately 200° F.) Conductor 11 connects engine overheat switch to emergency brake switch 12. Conductor 13 connects emergency brake switch 12 to timer 15. When contacts 14 of timer 15 are closed, current will flow through contacts 14 and through conductor 16 to gear shift switch 17. Current will also flow through conductor 46 to starter switch 45, but will stop at this point unless starter switch is manually operated. Back to gear shift switch 17 we find current will flow through this switch only if gear shift lever is placed in neutral or park position. With gear shift lever in neutral or park, the current will flow through switch 17 and through conductor 18 to E terminal of relay 61. At this point current will flow in two directions. First let's follow the current from E terminal on relay 61 through conductor 32 to one set of contacts on master switch 70. Another conductor 33 is fastened to same terminal on switch 70 as conductor 32. Current will flow through conductor 33 through contacts 34 of switch 70, through conductor 35 to cold side of ignition switch 36. From this point current flows through conductor 38 through ignition coil 39, through conductor 40, through breaker points 41 of distributor 42 to ground. Back to ignition switch 36 we find current will also flow through conductor 44 but stops at starter switch 45 unless manually energized. Up to this point we have followed the flow of current from battery 3 through master switch 70, through fuse 8, through water temperature overheat switch 10, through emergency brake switch 12, through timer 15, through gear shift switch 17 to relay 61, back through another set of contacts 34 of master switch 70 through ignition switch 36 through ignition coil 39 through distributor breaker points 41 to ground, thereby giving us the necessary spark or electrical impulse to ignite the fuel.

Going back to terminal E of relay 61 we find current will flow through contact 19 to B terminal of relay 61. From terminal B current will flow through conductor 20 through conductor 21, through heater element 22 of time delay relay 26 to ground 23. Time delay relay 26 requires application of current to heater element 22 for 10 seconds before contact 25 will open. Conductor 20 also fastens to conductor 24 allowing current to flow from conductor 20 through conductor 24, through conductor 25 of time delay relay 26 through conductor 27 to switch contact 28 of master switch 70.

From switch contact 28 of master switch 70 we find conductor 29 attached to conductor 27. Current will flow through conductor 29 through coil of starter relay 30 to ground 31, thereby energizing starter relay 30 and closing contacts 48. By closing contacts 48, current will flow from battery 3, through conductor 4 through terminal 5, through conductor 47 through starter relay contacts 48, through conductor 49, through starter motor 50 to ground 51.

We now have current flow to ignition coil and starter motor. The starter motor begins to turn engine and the ignition coil gives us ignition or spark to ignite the fuel.

If engine fails to start, heater element 22 of time delay relay 26 will open contact 25 at which time the current flow will be interrupted to the starter motor 50 and fast idle solenoid to prevent any further attempts at starting engine and exhausting the storage battery 3.

When engine starts, current will flow from generator 57 through conductor 55 to G terminal of voltage regulator 53, from G terminal of voltage regulator 53 through conductor 58 through master switch 70 contacts 59, through conductor 60, through coil of relay 61 to ground 62, energizing relay 61. When relay 61 is energized, contact points 19 are opened and current flow through these contacts to time delay relay 26 and starter relay 30 is stopped. This allows starter relay 30 contacts 48 to open and stop current flow to starter motor 50.

Now that engine is operating and starting equipment is stopped, we want to start air conditioning or heating equipment operation. Going back to fuse 8 we find current will flow through conductor 63 to D terminal of relay 61. When relay 61 is energized, contacts 64 close creating a path for current to flow from D terminal of relay 61 to A terminal of relay 61. Current will then flow through conductor 65 to either the air conditioner or heater controls, whichever is selected. Current flow to these controls will energize the necessary equipment for their operation.

In the event the engine should overheat, water temperature switch 10 would interrupt current flow and shut engine and controls "off." When engine cools sufficiently the starting and operating circuits would be energized again and the complete cycle as described in the preceding paragraphs would be repeated.

This completes the operation of the automatic starting procedures of the engine and operating procedures of the desired equipment.

When normal operation is desired, you merely place the master switch in the opposite position from that shown on the drawing and current will then flow from battery 3, through conductor 4, through terminal 5, through conductor 6, through contacts 7 of master switch 70 through conductor 37 to ignition switch 36. By turning "on" ignition switch 36 the contacts are closed and current will flow through conductor 38 to ignition coil 39 thereby furnishing ignition. Also current would flow from ignition switch 36 through conductor 44 to starter switch 45. By manually energizing starter switch 45, current will flow from conductor 44 through conductor 46 through gear shift switch 17 if gear shift lever is in park or neutral, through conductor 18 to E terminal of relay 61. From E terminal of relay 61 current will flow through conductor 32 through contact 28 of master switch 70 (switch being in opposite position to that shown on drawing) through conductor 29 to coil of starter relay 30. Energizing starter relay will operate starter and engine will be started in normal manner.

It can be seen by the preceding description that the part I claim as my invention are those components shown within the dotted lines on the drawing. These components consist of a timer 15, four pole double throw switch 70, a 6 or 12 volt relay 61 and time delay relay 26 and arrangement of these components and associated circuitry in such a manner as to automatically start an internal combustion engine, energize the necessary controls to pre-heat or pre-cool the inside of an automobile or vehicle before occupancy.

It can also be seen that said automobile or vehicle can be left unattended and unlocked without fear of being driven away or stolen provided the ignition has been left locked and key removed from switch.

I claim as my invention:

A system for automatically starting an internal combustion engine in a vehicle comprising: a source of current, an ignition circuit, an ignition switch in said ignition circuit, a starting circuit having a starting switch and a starting motor for cranking the engine, an accessory circuit, a generator, an auxiliary circuit, a manually operated four pole double throw master switch and a timer switch in said auxiliary circuit, said auxiliary circuit adapted to bypass said ignition switch and said starter switch and to connect said source of current with said ignition circuit and said starting motor upon a predetermined setting of said master switch, said timer switch adapted to complete said auxiliary circuit and energize said starter circuit and said ignition circuit at a predetermined time, a double throw relay adapted, upon a predetermined current from said generator after said engine has started, to open said starter circuit and to close said engine accessory circuit, a time delay relay in said auxiliary circuit opening said auxiliary circuit if the engine does not start in a predetermined time, and further means provided in said auxiliary circuit to open said ignition circuit if said vehicle is moved without first closing said ignition switch.

References Cited in the file of this patent
UNITED STATES PATENTS

| | | |
|---|---|---|
| 2,550,026 | Short | Apr. 24, 1951 |
| 2,579,958 | Perhats | Dec. 25, 1951 |